United States Patent [19]
Yanagisawa

[11] Patent Number: 5,698,959
[45] Date of Patent: Dec. 16, 1997

[54] ROBOT WITH TWO DIMENSIONAL DRIVING MECHANISM

[76] Inventor: Ken Yanagisawa, c/o, Kabushiki Kaisha Mechanic Sekkei Jimusho 5175-1, Ooaza Toyoshina, Toyoshina-machi, Minamiazumi-gun, Nagano-ken, Japan

[21] Appl. No.: 627,274

[22] Filed: Apr. 4, 1996

[30] Foreign Application Priority Data

Apr. 5, 1995 [JP] Japan ................................ 7-080305

[51] Int. Cl.⁶ ............................ F16H 21/02; F16H 25/20
[52] U.S. Cl. .................... 318/568.11; 74/27; 74/89.11; 74/89.15; 414/751
[58] Field of Search ................... 318/568.11, 568.2, 318/568.21; 74/27, 89.11, 89.15, 89.17, 409, 490.09, 606 R; 108/20, 137, 143; 212/284; 248/317, 424, 429; 414/749, 750, 751; 901/8

[56] References Cited

U.S. PATENT DOCUMENTS

| | | | |
|---|---|---|---|
| 4,156,367 | 5/1979 | Pardo et al. | |
| 4,729,536 | 3/1988 | Scala | |
| 4,973,819 | 11/1990 | Thatcher | 219/121.78 |
| 5,214,976 | 6/1993 | Yanagisawa | 74/479 R |
| 5,222,424 | 6/1993 | Yanagisawa | 91/176 |
| 5,279,178 | 1/1994 | Yanagisawa | 74/479 PH |
| 5,311,790 | 5/1994 | Yanagisawa | 74/479 PH |
| 5,546,826 | 8/1996 | Yanagisawa | 74/490.09 |

FOREIGN PATENT DOCUMENTS

| | | |
|---|---|---|
| 2-110744 | 9/1990 | Japan . |
| 3-55182 | 5/1991 | Japan . |
| 5-31683 | 2/1993 | Japan . |

*Primary Examiner*—Bentsu Ro
*Attorney, Agent, or Firm*—Birch, Stewart, Kolasch & Birch, LLP

[57] ABSTRACT

An object of the present invention is to provide a robot, which is capable of moving a multi-joint arm unit in a broad area with high positioning accuracy and high speed. In the robot of the present invention, first guides are arranged in a first direction. Second guides are arranged in a second direction perpendicular to the first direction. A first moving guide is arranged parallel to the first guides and capable of moving along the second guides. A second moving guide is arranged parallel to the second guides and capable of moving along the first guides. A moving body is capable of moving on the first moving guide and the second moving guide. A first driving mechanism moves the first moving guide. A second driving mechanism moves the second moving guide. The multi-joint arm unit is rotatably attached to the moving body and has a plurality of arms whose ends are pivotably connected each other.

15 Claims, 7 Drawing Sheets

ROBOT WITH TWO DIMENSIONAL DRIVING MECHANISM

BACKGROUND OF THE INVENTION

The present invention relates to a robot, more precisely relates to a robot having a multi-joint arm unit, which can be moved freely.

Multi-joint arm robots have been employed in factories, e.g., automobile factories. The multi-joint arm robot is capable of rotating, and it has a plurality of arms, which are seriesly connected and controlled independently. A front end of the outermost arm is a free end, so there is attached a robot head for machining or holding work pieces at the free end. The innermost arm is pivotably connected to a base of the robot, so that the robot head can be moved freely in a three dimensional space.

But, since the front end of the multi-joint arm robot has the free end, the arms must have greater durability so as to prevent vibration of the free end. Further, weight loads concentrate on joint sections of the arms, so that greater force is required to drive the joint sections.

In view of the above described problems, the conventional robot must be large in size, and manufacturing cost must be increased. In the large conventional robot, its weighs heavy and the inertia of moving parts must be greater while operating, so that it is difficult to accelerate the operating speed of the robot. Thus, if work pieces are located far from the robot, positioning accuracy and manufacturing efficiency cannot be increased due to the inertia and the low speed operation.

Figure 9:
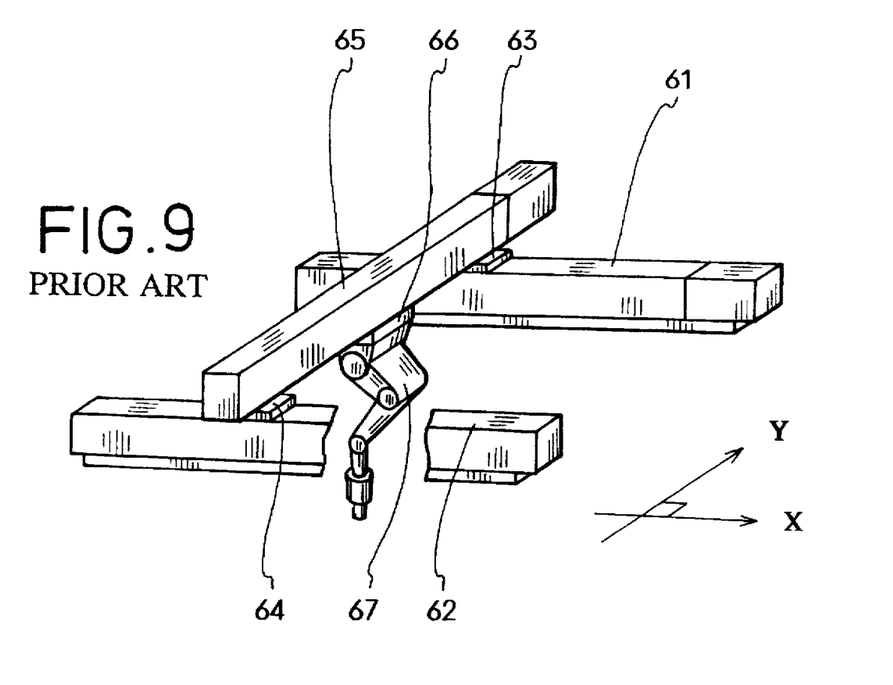
FIG. 9 is a perspective view of the conventional robot.

To solve above described disadvantages, a robot shown in FIG. 9 was provided, the robot has: a pair of X-guides 61 and 62; a pair of X-travellers 63 and 64, which are moved alongside the X-guides 61 and 62; a Y-guide 65 spanned between the X-travellers 63 and 64; a Y-traveller 66, which is moved alongside the Y-guide 65; and a multi-joint arm unit 67, which is moved in the X- and the Y-directions. The robot is capable of moving the multi-joint arm unit 67, so that an operation in a broad area can be executed even if the multi-joint arm unit has short arms.

However, since the drive mechanism for moving in the Y-direction is mounted on the drive mechanism for moving in the X-direction, the vertical size of the robot must be larger, and it is difficult to stably operate because operating conditions of the X-travellers 63 and 64 is different from those of the Y-traveller 66.

Further, since the Y-traveller 66 supports the multi-joint arm unit and is held by the Y-guide 65, swinging or rolling in the Y-direction can be prevented but rolling in the X-direction cannot be prevented. Therefore, it is difficult to increase positioning accuracy of the multi-joint arm unit.

SUMMARY OF THE INVENTION

An object of the present invention is to provide a robot, which is capable of moving a multi-joint arm unit in a broad area with high positioning accuracy and high speed.

To achieve the object, the robot of the present invention has the following structures:

The robot of the present invention comprises:
- a pair of first guides being arranged in a first direction;
- a pair of second guides being arranged in a second direction perpendicular to the first direction;
- a first moving guide being arranged parallel to the first guides, ends of the first moving guide being movably connected with the second guides, whereby the first moving guide is capable of moving in the second direction along the second guides;
- a second moving guide being arranged parallel to the second guides, ends of the second moving guide being movably connected with the first guides, whereby the second moving guide is capable of moving in the first direction along the first guides;
- a moving body being capable of moving on the first moving guide and the second moving guide, whereby the moving body is capable of moving in the first direction and the second direction within a plane enclosed by the first guides and the second guides;
- a first driving mechanism for moving the first moving guide;
- a second driving mechanism for moving the second moving guide; and
- a multi-joint arm unit being rotatably attached to the moving body, the multi-joint arm unit has a plurality of arms whose ends are pivotably connected each other.

In the robot of the present invention, the following structures may be employed:
- ends of the first moving guide are respectively fixed to second travellers, each of which is capable of moving alongside each of the second guides;
- ends of the second moving guides are respectively fixed to first travellers, each of which is capable of moving alongside each of the first guides;
- the first driving mechanism includes a first ball screw, which is arranged in the second direction and screwed with one of the second travellers, and a first motor for rotating the first ball screw; and
- the second driving mechanism includes a second ball screw, which is arranged in the first direction and screwed with one of the first travellers, and a second motor for rotating the second ball screw.

In the robot of the present invention, following structures may be employed:
- ends of the first moving guide are respectively fixed to second travellers, each of which is capable of moving alongside each of the second guides;
- ends of the second moving guide are respectively fixed to first travellers, each of which is capable of moving alongside each of the first guides;
- the first driving mechanism includes a second rack, which is arranged parallel to the second guide, a pinion gear, which is provided to the second traveller and engaged with the second rack, and a first motor for rotating the pinion gear, which is mounted on the second traveller; and
- the second driving mechanism includes a first rack, which is arranged parallel to the first guide, a pinion gear, which is provided to the first traveller and engaged with the first rack, and a second motor for rotating the pinion gear, which is mounted on the first traveller.

The robot may further comprise:
- a first parallel mechanism for keeping the first moving guide parallel to the first guides; and
- a second parallel mechanism for keeping the second moving guide parallel to the second guides.

And the robot of the present invention comprises a frame structure being provided along a conveying route of works, at least three faces of the frame structure enclosing the conveying route, wherein at least one of the three faces has:
- a pair of first guides being arranged in a first direction;
- a pair of second guides being arranged in a second direction perpendicular to the first direction;
- a first moving guide being arranged parallel to the first guides, ends of the first moving guide being movably connected with the second guides, whereby the first moving guide is capable of moving in the second direction along the second guides;
- a second moving guide being arranged parallel to the second guides, ends of the second moving guide being movably connected with the first guides, whereby the second moving guide is capable of moving in the first direction along the first guides;
- a moving body being capable of moving on the first moving guide and the second moving guide, whereby the moving body is capable of moving in the first direction and the second direction within a plane enclosed by the first guides and the second guides;
- a first driving mechanism for moving the first moving guide;
- a second driving mechanism for moving the second moving guide; and
- a multi-joint arm unit being rotatably attached to the moving body, the multi-joint arm unit has a plurality of arms whose ends are pivotably connected each other.

Further, a robot line, which includes the robot of the present invention, comprises a plurality of frame structures being provided along a conveying route of works, at least three faces of each of the frame structures enclosing the conveying route, wherein at least one of the three faces has:
- a pair of first guides being arranged in a first direction;
- a pair of second guides being arranged in a second direction perpendicular to the first direction;
- a first moving guide being arranged parallel to the first guides, ends of the first moving guide being movably connected with the second guides, whereby the first moving guide is capable of moving in the second direction along the second guides;
- a second moving guide being arranged parallel to the second guides, ends of the second moving guide being movably connected with the first guides, whereby the second moving guide is capable of moving in the first direction along the first guides;
- a moving body being capable of moving on the first moving guide and the second moving guide, whereby the moving body is capable of moving in the first direction and the second direction within a plane enclosed by the first guides and the second guides;
- a first driving mechanism for moving the first moving guide;
- a second driving mechanism for moving the second moving guide; and
- a multi-joint arm unit being rotatably attached to the moving body, the multi-joint arm unit has a plurality of arms whose ends are pivotably connected each other.

In the present invention, the moving body, to which the multi-joint arm unit is attached, can be stably operated in the broad plane enclosed by the first guides and the second guides with higher positioning accuracy.

Since the moving body can be moved in the broad area, operating area of the multi-joint arm unit can be broader even if the multi-joint arm unit is a small one.

By employing the small multi-joint arm unit, the operating speed can be accelerated, so that working efficiency can be raised.

The inertia caused by the movement of the moving body and the multi-joint arm unit can be reduced by holding the first moving guide and the second moving guide with four sides, so that rolling of the multi-joint arm unit can be prevented.

Further, by employing the frame structure or structures, a unit of the robot can be realized, so that a robot line for manufacturing products can be freely and optionally designed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

Figure 1:
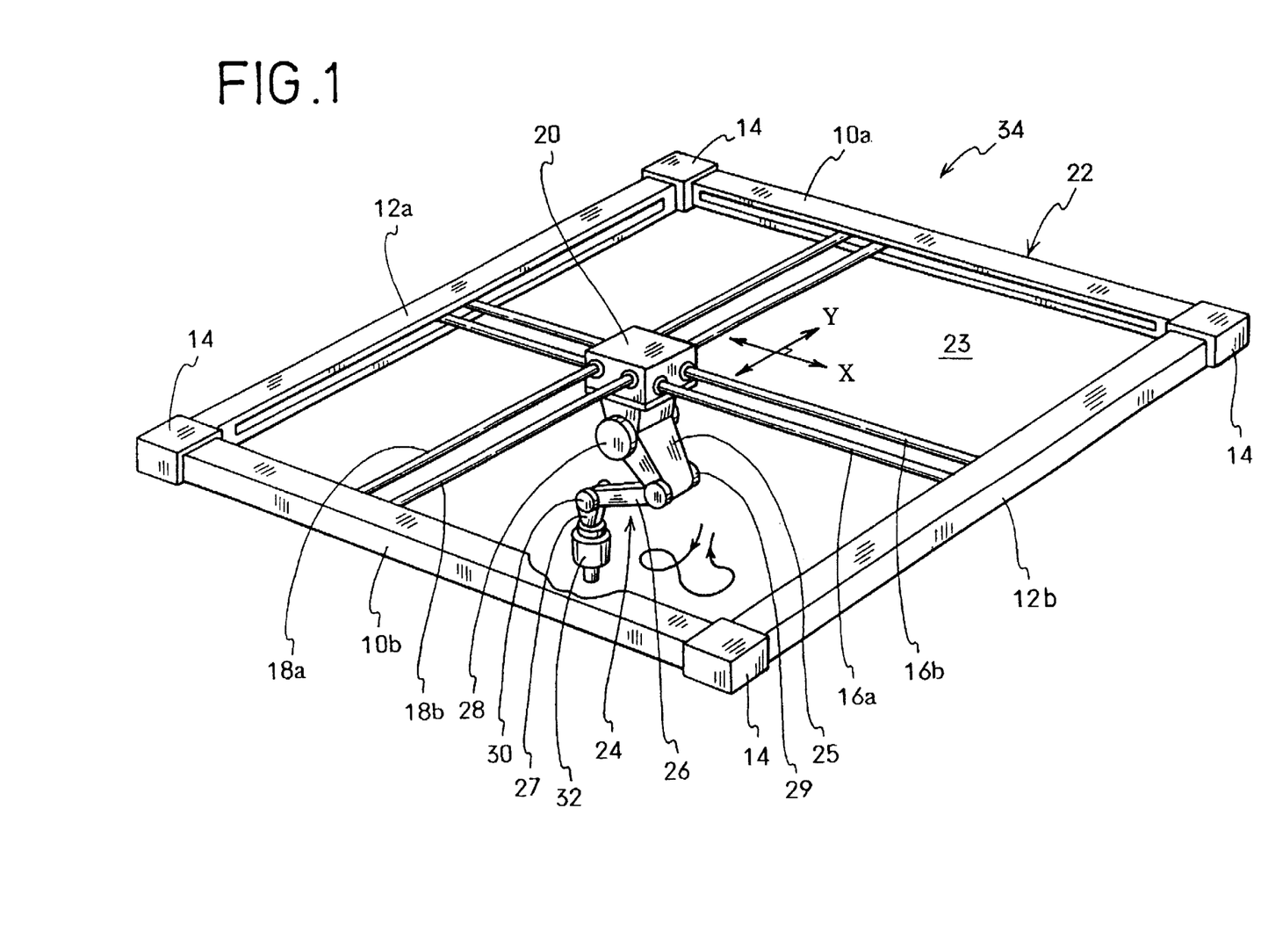
FIG. 1 is a perspective view of First Embodiment of the robot of the present invention.

A robot of First Embodiment of the present invention will be explained with reference to FIG. 1. Note that, in the First Embodiment, the X-direction is a first direction; the Y-direction is a second direction.

X-side members 10$a$ and 10$b$ constitute two sides of a rectangular frame section 22. The X-side members 10$a$ and 10$b$ are arranged in the X-direction. A pair of first guides (not shown) are provided parallel to the X-direction, in the X-side members 10$a$ and 10$b$ respectively.

Y-side members 12$a$ and 12$b$ constitute two sides of a rectangular frame section 22. The Y-side members 12$a$ and 12$b$ are arranged in the Y-direction. A pair of second guides (not shown) are provided parallel to the Y-direction, in the Y-side members 12$a$ and 12$b$ respectively.

The X-side members 10$a$ and 10$b$ and the Y-side members 12$a$ and 12$b$ are mutually connected by blocks 14, which are provided at four corners of the frame section 22, so that they are formed in a rectangular frame.

X-moving shafts 16$a$ and 16$b$ are arranged in the X-direction. Ends of the X-moving shafts 16$a$ and 16$b$ are movably connected with the second guides. Thus, the X-moving shafts 16a and 16b can be moved, in the Y-direction, along the second guides as first moving guides.

Y-moving shafts 18a and 18b are arranged in the Y-direction. Ends of the Y-moving shafts 18a and 18b are movably connected with the first guides. Thus, the Y-moving shafts 18a and 18b can be moved, in the X-direction, along the first guides as second moving guides.

Besides the shafts which pierce through a moving body 20, elongated tough members, e.g., linear guides, may be employed as the first moving guide and the second moving guide.

The X-moving shafts 16a and 16b and the Y-moving shafts 18a and 18b are pierced through the moving body 20. The moving body 20 is capable of moving, in the X- and the Y-directions, on the X-moving shafts 16a and 16b and the Y-moving shafts 18a and 18b. Thus, the moving body 20 can be moved in a plane 23 enclosed by the frame section 22.

The moving body 20 is moved by a first driving mechanism (not shown), which is capable of moving the X-moving shafts 16a and 16b in the Y-direction, and a second driving mechanism (not shown), which is capable of moving the Y-moving shafts 18a and 18b in the X-direction. Any types of driving mechanisms may be employed as the first driving mechanism and the second driving mechanism.

A multi-joint arm unit 24 is attached on a bottom face of the moving body 20. A base section of the multi-joint arm unit 24 is capable of rotating, about a vertical axis, with respect to the moving body 20. The multi-joint arm unit 24 has three arms 25, 26 and 27, which are seriesly connected. The arms 25, 26 and 27 are mutually pivotably connected by horizontal axes 28, 29 and 30. The movement of the arms 25, 26 and 27 can be respectively controlled by a known manner. There is provided a robot head 32 for machining work pieces, etc. at a front end of the outermost arm 27. With above described structure, the robot head 32 can be freely operated in a three dimensional space.

Note that, in the multi-joint arm unit 24, the number of the arms, the position and number of a rotatable section or sections, the type of the robot head attached, etc. may be optionally designed according to work pieces, etc.

In the robot 34 having the above described structures, the moving body 20, to which the multi-joint arm unit 24 is attached, the X-moving shafts 16a and 16b, and the Y-moving shafts 18a and 18b are held by four sides of the frame section 22, which include the first guides and the second guides. Since the moving body 20, etc. are held by the four sides, the moving body 20 can be stably operated and repeatedly positioned with higher accuracy. The multi-joint arm unit 24 can be moved in a broad area together with the moving body 20, so that the multi-joint arm unit 24 can be operated in the broad area even if it is a small unit. In the case of the small multi-joint arm unit 24, it can be moved at high speed.

Inertia caused by the movement of the moving body 20 and the multi-joint arm unit 24 can be received by the four sides of the frame section 22 via the X-moving shafts 16a and 16b and the Y-moving shafts 18a and 18b. Thus, rolling of the moving body 20 can be prevented, so that the moving body 20 and the multi-joint arm unit 24 can be repeatedly positioned with higher accuracy and moved at high speed.

Figure 2:
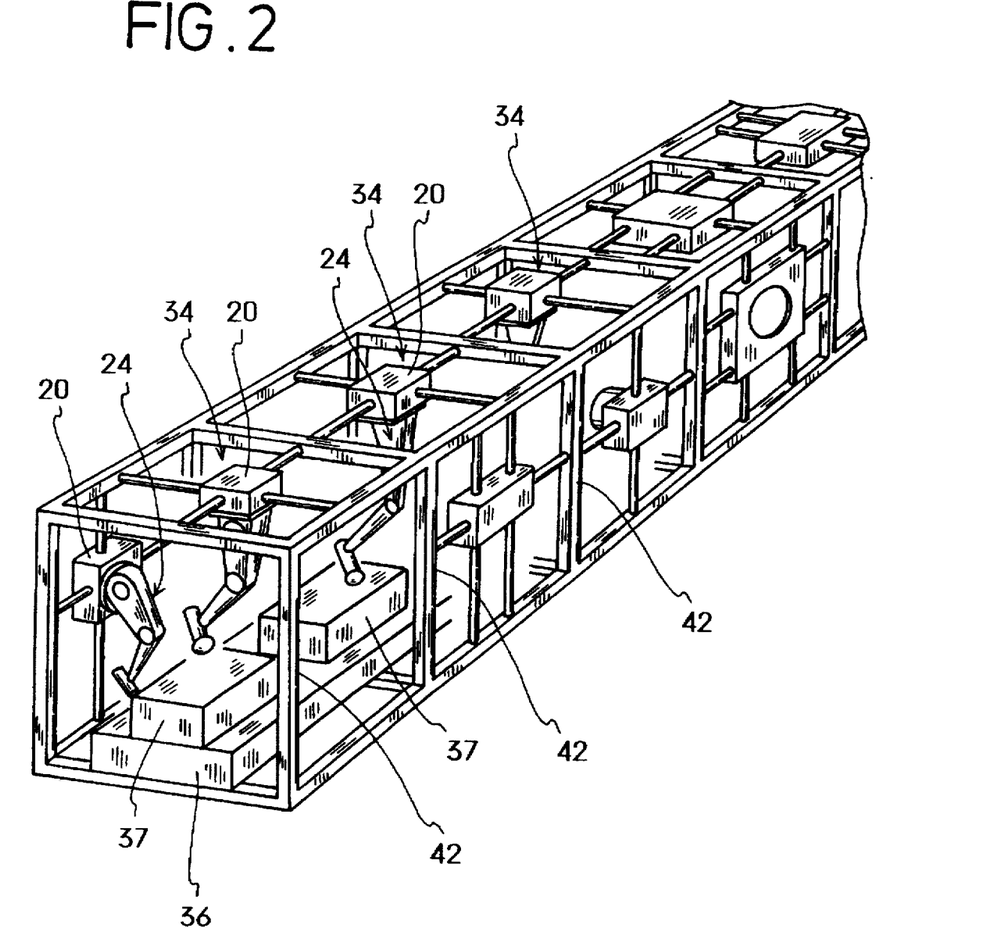
FIG. 2 is a perspective view of an example of a robot line.
Figure 3:
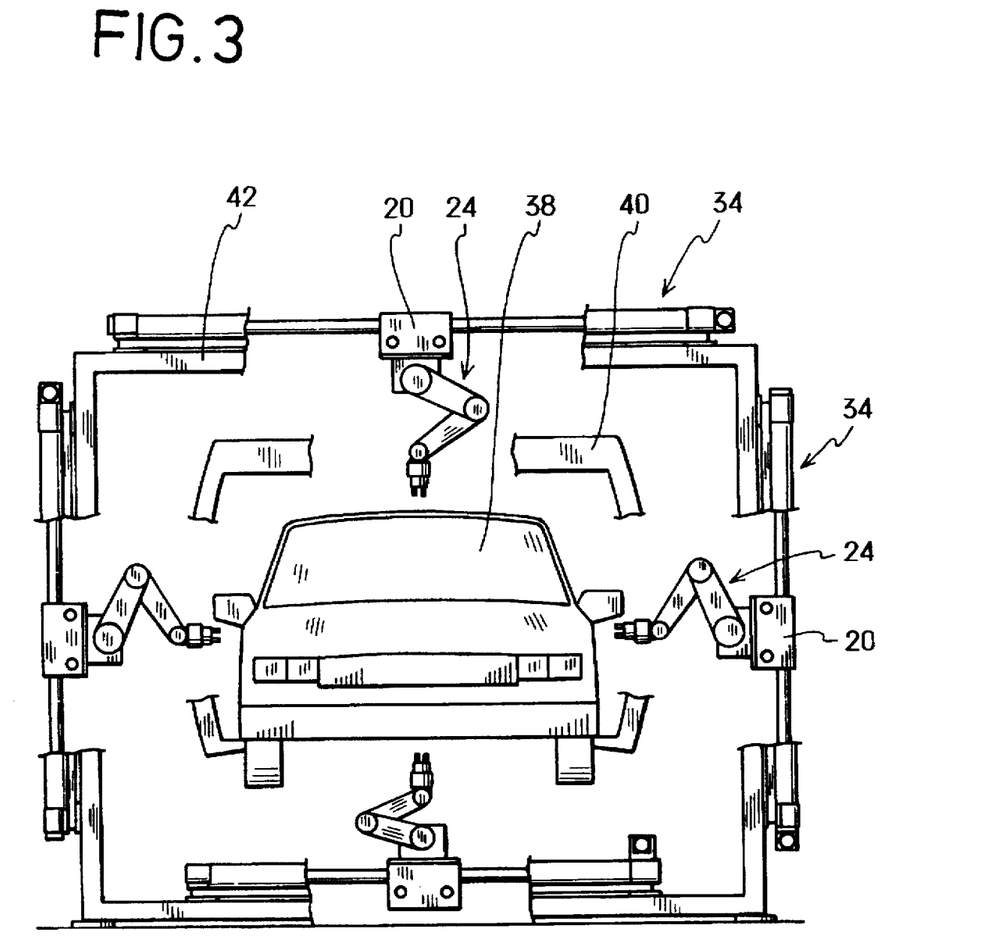
FIG. 3 is a front view of an example of a unit of the robot.

Robot production line in a factory, which is composed of the robots 34, is shown in FIGS. 2 and 3.

FIG. 2 is a perspective view of the robot line. Multiple robots 34 are seriesly arranged along a conveyor 36, which is a conveying route of works 37.

The conveying route of the works 37 is not limited to the conveyor 36 on a floor. In the robot line shown in FIG. 3, a conveying mechanism 40, which is capable of conveying a car 38 as the work, is employed as the conveying route.

Four faces of a frame structure 42, which is formed into a cube, enclose the conveying mechanisms 36 and 40 of the works 37 and 38. The works 37 and 38 on the conveying route 36 and 40 are capable of moving through the frame structure 42. Each frame structure 42 is one unit of the robot production line. By seriesly connecting a plurality of the units 42, a long production line, through which the conveying mechanisms 36 and 40 of the works 37 and 38 are passed, can be formed like a tunnel. There is provided a robot 34 in at least one of the four faces of the frame structure 42, which is arranged parallel to the conveying mechanisms 36 and 40. The driving mechanisms of the robot 34 may be provided in the frame structure (see FIG. 2). And the driving mechanisms of the robot 34 may be fixed on the sides of the frame structure (see FIG. 3). Since each robot unit or the frame structure 42 is formed into the cube, the robot line can be optionally designed according to a space in which the robot line is installed.

In the case of the tunnel like robot line, the frame structure 42 may enclose the conveying mechanisms 36 and 40 by three faces, or five faces or more, which are parallel to the conveying route 36 and 40.

If a lot of robots 34 are arranged along the conveying mechanisms 36 and 40 of the works 37 and 38, a plurality of works can be executed simultaneously, so that manufacturing efficiency can be raised.

By connecting the frame structures 42, each of which has one robot 34 or more as one unit, so as to form the robot line, parts of the robot line can be made unit by unit. And the robot line can be easily changed, so that the robot line can be applied for a many uses. The frame structures 42 can be connected in every direction according to manufacturing conditions, etc.

Figure 4:
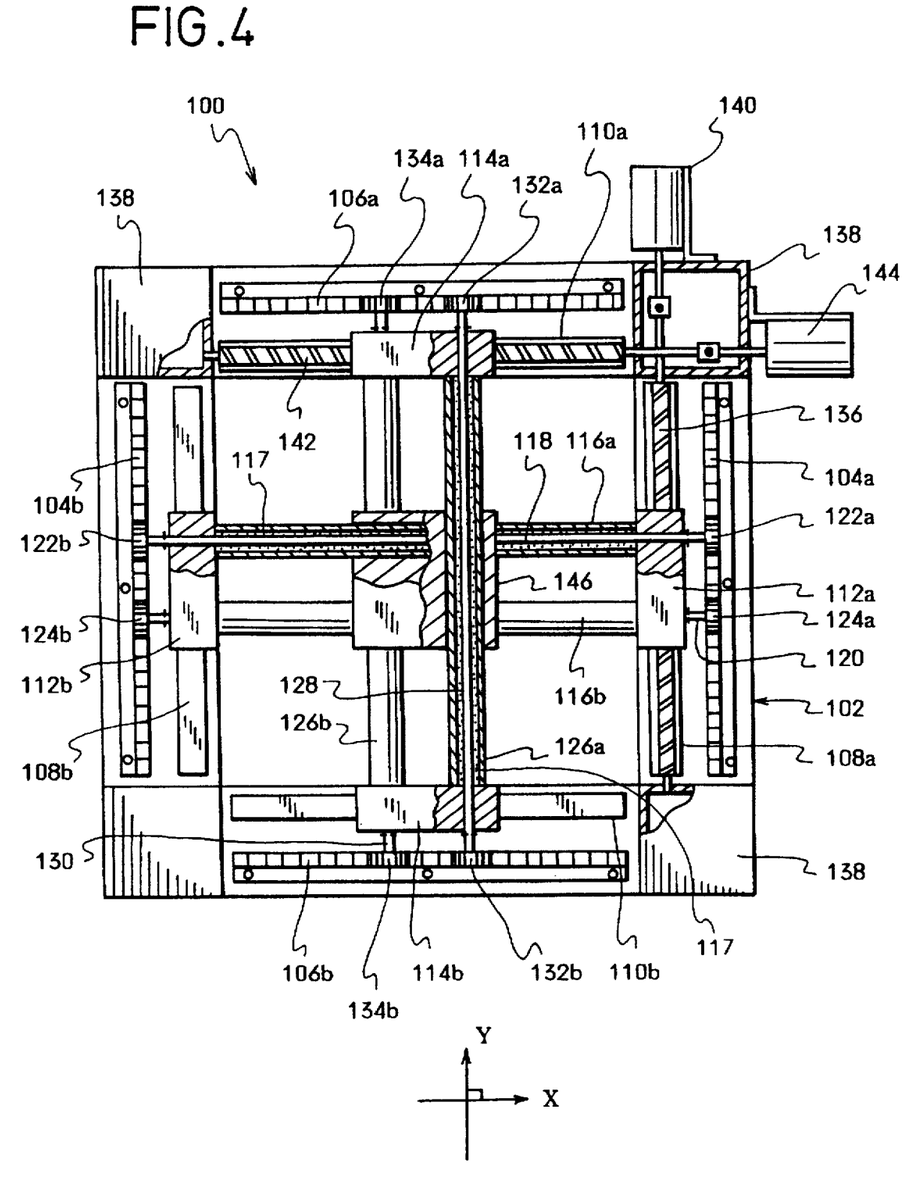
FIG. 4 is a plan view of Second Embodiment.

The Second Embodiment will be explained with reference to FIG. 4. In the Second Embodiment, the Y-direction is the first direction; the X-direction is the second direction.

A base 102 is formed into a hollow rectangular frame.

First racks 104a and 104b are fixed on the base 102. The first racks 104a and 104b are arranged parallel in the Y-direction.

Second racks 106a and 106b are fixed on the base 102. The second racks 106a and 106b are arranged parallel in the X-direction.

First linear guides 108a and 108b, which are the first guides, are fixed on the base 102. The first linear guides 108a and 108b are provided on inner sides of the first racks 104a and 104b, and arranged parallel in the Y-direction.

Second linear guides 110a and 110b, which are the second guides, are fixed on the base 102. The second linear guides 110a and 110b are provided on inner sides of the second racks 106a and 106b, and arranged parallel in the X-direction.

First travellers 112a and 112b are slidably fitted with the first linear guides 108a and 108b respectively, and they cannot be detached therefrom. Thus, the first travellers 112a and 112b are capable of moving, in the Y-direction, alongside the first linear guides 108a and 108b.

Second travellers 114a and 114b are slidably fitted with the second linear guides 110a and 110b respectively, and they cannot be detached therefrom. Thus, the second travellers 114a and 114b are capable of moving, in the X-direction, alongside the second linear guides 110a and 110b.

First pipes 116a and 116b, which are the first moving guides, are arranged parallel in the X-direction. Ends of the first pipes 116a and 116b are respectively fixed to the first travellers 112a and 112b.

A first shaft 118 is arranged in the X-direction. The first shaft 118 is a metal shaft. The first shaft 118 is rotatably pierced through the first pipe 116a and the second travellers 112a and 112b. End sections of the first shaft 118 are projected outward from the first travellers 112a and 112b. There are fitted snap rings on outer circumferential faces of the end sections of the first shaft 118, which are projected outward from the first travellers 112a and 112b, so as to limit axial movement of the first shaft 118.

A second shaft 120 is arranged in the X-direction. The second shaft 120 is a metal shaft. The second shaft 120 is rotatably pierced through the first pipe 116b and the first travellers 112a and 112b. End sections of the second shaft 120 are projected outward from the first travellers 112a and 112b. There are fitted snap rings on outer circumferential faces of the end sections of the second shaft 120, which are projected outward from the first travellers 112a and 112b, so as to limit axial movement of the second shaft 120.

Note that, since the ends of the first pipes 116a and 116b are fixed to the first travellers 112a and 112b, the first travellers 112a and 112b are integrally moved in the Y-direction. A lubricant 117, e.g., grease, is filled in the first pipes 116a and 116b so as to prevent noise and abrasion between the first and the second shafts 118 and 120 and the first pipes 116a and 116b.

First pinion gears 122a and 122b are respectively fixed to each end of the first shaft 118. The first pinion gears 122a and 122b are respectively engaged with the first racks 104a and 104b, and they can be rolled thereon. Thus, the first pinion gears 122a and 122b are rotated together with the first shaft 118 and rolled on the first racks 104a and 104b when the first travellers 112a and 112b are moved in the Y-direction.

Second pinion gears 124a and 124b are respectively fixed to each end of the second shaft 120. The second pinion gears 124a and 124b are respectively engaged with the first racks 104a and 104b, and they can be rolled thereon. Thus, the second pinion gears 124a and 124b are rotated together with the second shaft 120 and rolled on the second racks 104a and 104b when the first travellers 112a and 112b are moved in the Y-direction.

Second pipes 126a and 126b, which are the second moving guides, are arranged parallel in the Y-direction. Ends of the second pipes 126a and 126b are respectively fixed to the second travellers 114a and 114b.

A third shaft 128 is arranged in the Y-direction. The third shaft 128 is a metal shaft. The third shaft 128 is rotatably pierced through the second pipe 126a and the second travellers 114a and 114b. End sections of the third shaft 128 are projected outward from the second travellers 114a and 114b. There are fitted snap rings on outer circumferential faces of the end sections of the third shaft 128, which are projected outward from the second travellers 114a and 114b, so as to limit axial movement of the third shaft 128.

A fourth shaft 130 is arranged in the Y-direction. The fourth shaft 130 is a metal shaft. The fourth shaft 130 is rotatably pierced through the second pipe 126b and the second travellers 114a and 114b. End sections of the fourth shaft 130 are projected outward from the second travellers 114a and 114b. There are fitted snap rings on outer circumferential faces of the end sections of the fourth shaft 130, which are projected outward from the second travellers 114a and 114b, so as to limit axial movement of the fourth shaft 130.

Since the ends of the second pipes 126a and 126b are fixed to the second travellers 114a and 114b, the second travellers 114a and 114b are integrally moved in the X-direction. The lubricant 117, e.g., grease, is filled in the second pipes 126a and 126b so as to prevent noise and abrasion between the third and the fourth shafts 128 and 130 and the second pipes 126a and 126b.

Third pinion gears 132a and 132b are respectively fixed to each end of the third shaft 128. The third pinion gears 132a and 132b are respectively engaged with the second racks 106a and 106b, and they can be rolled thereon. Thus, the third pinion gears 132a and 132b are rotated together with the third shaft 128 and rolled on the second racks 106a and 106b when the second travellers 114a and 114b are moved in the X-direction.

Fourth pinion gears 134a and 134b are respectively fixed to each end of the fourth shaft 130. The fourth pinion gears 134a and 134b are respectively engaged with the first racks 106a and 106b, and they can be rolled thereon. Thus, the fourth pinion gears 134a and 134b are rotated together with the fourth shaft 130 and rolled on the second racks 106a and 106b when the second travellers 114a and 114b are moved in the X-direction.

A first ball screw 136 constitutes a first driving mechanism, which moves the first travellers 112a and 112b and the first pipes 116a and 116b. The first ball screw 136 is arranged, on the base 102, in the Y-direction. The first ball screw 136 is spanned between corner blocks 138 on the base 102 and capable of rotating about its axial line. The first ball screw 136 is screwed with the first traveller 112a. Thus, the first travellers 112a and 112b and the first pipes 116a and 116b are moved in the Y-direction when the first ball screw 136 is rotated about its axial line.

A first servo motor 140, which also constitutes the first driving mechanism, rotates the first ball screw 136. The first servo motor 140 is fixed on the base 102. An output shaft of the first servo motor 140 is connected with the first ball screw 136 by a coupler. By adjusting rotational speed and rotational directions of the first servo motor 140, moving speed and moving directions of the second travellers 112a and 112b and the first pipes 116a and 116b can be controlled.

A second ball screw 142 constitutes a second driving mechanism, which moves the second travellers 114a and 114b and the second pipes 126a and 126b. The second ball screw 142 is arranged, on the base 102, in the X-direction. The second ball screw 142 is spanned between corner blocks 138 on the base 102 and capable of rotating about its axial line. The second ball screw 136 is screwed with the second traveller 114a. Thus, the second travellers 114a and 114b and the second pipes 126a and 126b are moved in the X-direction when the second ball screw 142 is rotated about its axial line.

A second servo motor 144, which also constitutes the second driving mechanism, rotates the second ball screw 142. The second servo motor 144 is fixed on the base 102. An output shaft of the second servo motor 144 is connected with the second ball screw 142 by a coupler. By adjusting rotational speed and rotational directions of the second servo motor 144, moving speed and moving directions of the second travellers 114a and 114b and the second pipes 126a and 126b can be controlled.

A moving body 146 is capable of moving on the first pipes 116a and 116b and the :second pipes 126a and 126b. Thus, the moving body 146 is moved in the Y-direction together with the first pipes 116a and 116b when the first travellers 112a and 112b are moved in the Y-direction. On the other hand, the moving body 146 is mowed in the X-direction together with the second pipes 126a and 126b when the second travellers 114a and 114b are moved in the X-direction. There is attached the multi-joint arm unit, not shown (see FIG. 1 of the First Embodiment) to the moving body 146. In the Second Embodiment, the moving body 146 is capable of moving on the first pipes 116a and 116b and the second pipes 126a and 126b, but it can be moved on the first shaft 118, the second shaft 120, the third shaft 128 and the fourth shaft 130 as the first and the second moving guides.

In the robot 100 having the above described structures, the second traveller 114a, which is guided by the second linear guide 110a, is moved in the X-direction together with the moving body 146 when the second motor 144 rotates the second ball screw 142. Since the second travellers 114a and 114b are mutually connected by the second pipes 126a and 126b, the second traveller 114b is moved together with the second traveller 114a. Similarly, the first traveller 112a, which is guided by the first linear guide 108a, is moved in the Y-direction together with the moving body 146 when the first motor 140 rotates the first ball screw 136. Since the first travellers 112a and 112b are mutually connected by the first pipes 116a and 116b, the first traveller 112b is moved together with the first traveller 112a. Thus, the multi-joint arm unit, which is attached to the moving body 146, can be moved in the X- and the Y-directions.

Successively, the third pinion gears 132a and 132b and the fourth pinion gears 134a and 134b shown in FIG. 4 will be described in detail with reference to FIGS. 5 and 6. Note that, structures of the first pinion gears 122a and 122b and the second pinion gears 124a and 124b are the same as those of the third pinion gears 132a and 132b and the fourth pinion gears 134a and 134b, so their explanation will be omitted.

Figure 6:
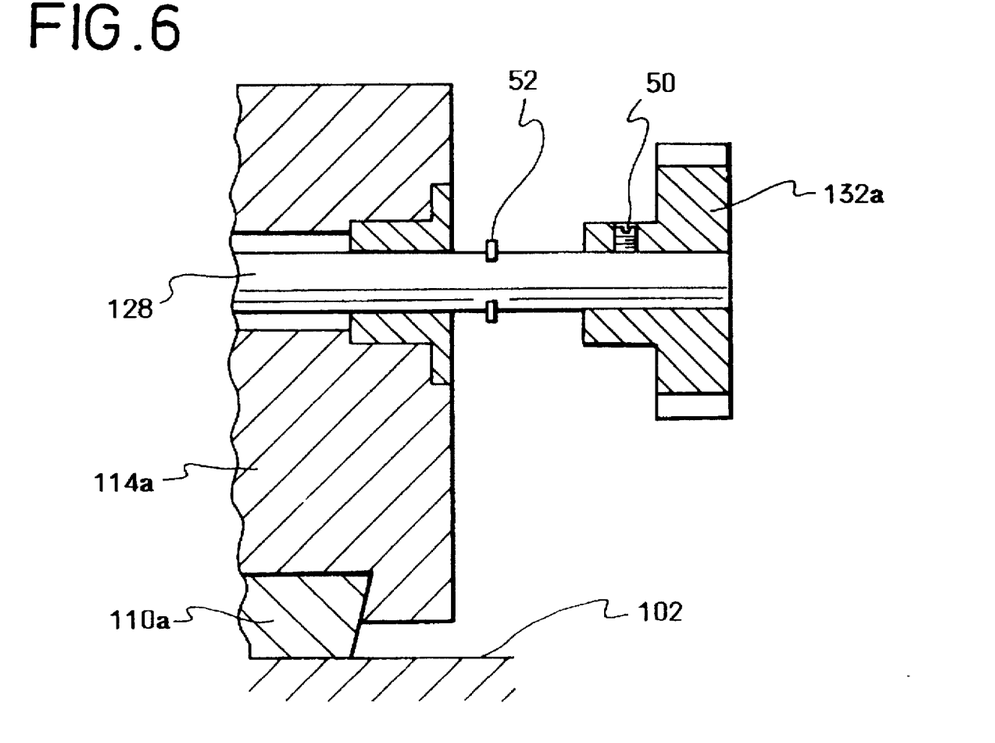
FIG. 6 is a partial sectional view in the vicinity of the first pinion gear of the Second Embodiment.

As clearly shown in FIG. 6, the third pinion gear 132a is fitted on the outer circumferential face of one end of the third shaft 128 and fixed to the third shaft 128 by a bolt 50. The third pinion gear 132b, not shown, is also fixed to the other end of the third shaft 128 by the same manner. The fourth pinion gears 134a and 134b are fixed to each end of the fourth shaft 130 by the same manner.

Figure 5:
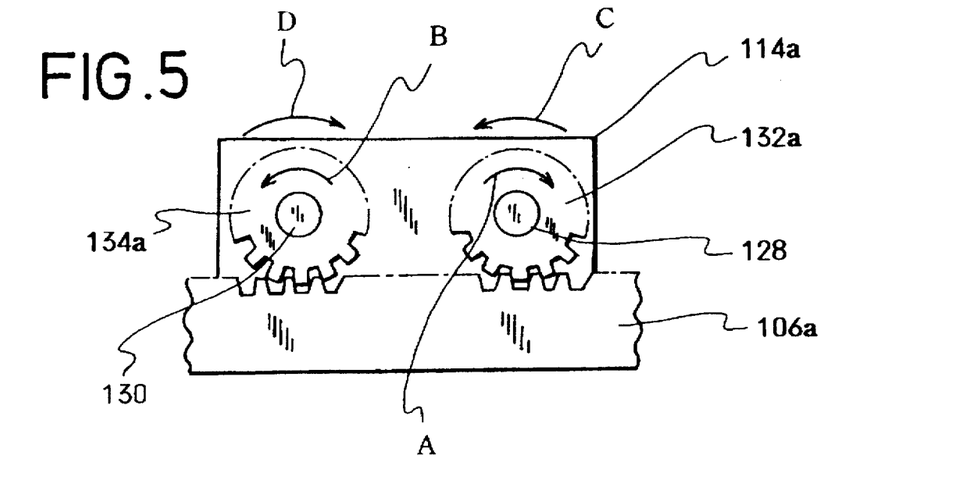
FIG. 5 is a partial side view in the vicinity of a first pinion gear and a second pinion gear of the Second embodiment.

Torsion in a direction of an arrow A, which is also a third circumferential direction, is applied to the third shaft 128, and the third pinion gears 132a and 132b are respectively engaged with the second racks 106a and 106b (see FIG. 5). On the other hand, torsion in a direction of an arrow B, which is a fourth circumferential direction, is applied to the fourth shaft 130, and the fourth pinion gears 134a and 134b are respectively engaged with the second racks 106a and 106b (see FIG. 5).

A method of fixing the third pinion gears 132a and 132b onto the third shaft 128, which has been pierced through the second travellers 114a and 114b, will be explained. Firstly, the kind pinion gear 132b is engaged with the second rack 106b, then the bolt 50 is screwed to fix the pinion gear 132b to the shaft. Next, the bolt 50 of the third pinion gear 132a, which has been engaged with the second rack 106a, is unscrewed, then the third shaft 128 is made free with respect to the third pinion gear 132a. Then, torsion in the direction of the arrow A is applied to the third shaft 128 by a tool, e.g., a torque wrench. After the torsion is applied, the bolt 50 of the third pinion gear 132a is screwed, so that the third pinion gears 132a and 132b are fixed on the third shaft 128 to which the torsion has been applied.

Similarly, a method of fixing the fourth pinion gears 134a and 134b onto the second shaft 130, which has been pierced through the second travellers 114a and 114b, will be explained. Firstly, the fourth pinion gear 134b is engaged with the second rack 106b, then the bolt 50 is screwed to fix the pinion 134b to the shaft. Next, the bolt 50 of the fourth pinion gear 134a, which has been engaged with the second rack 106a, is unscrewed, then the fourth shaft 130 is made free with respect to the fourth pinion gear 134a. Then, torsion in direction of the arrow B is applied to the fourth shaft 130 by the torque wrench. After the torsion is applied, the bolt 50 of the fourth pinion gear 134a is screwed, so that the fourth pinion gears 134a and 134b are fixed on the fourth shaft 130 to which the torsion has been applied.

The first pinion gears 122a and 122b and the second pinion gears 124a and 124b can be respectively fixed to the first shaft 118 and the second shaft 120 by the same method.

The third pinion gears 132a and 132b are respectively engaged with the second racks 106a and 106 in a state of applying the torsion, in the third circumferential direction, to the third shaft 128. On the other hand, the fourth pinion gears 134a and 134b are respectively engaged with the second racks 106a and 106 in a state of applying the torsion, in the fourth circumferential direction which is the opposite direction of the third circumferential direction, to the fourth shaft 130.

The first pinion gears 122a and 122b are respectively engaged with the first racks 104a and 104b in a state of applying the torsion, in a first circumferential direction, to the first shaft 118. On the other hand, the second pinion gears 124a and 124b are respectively engaged with the first racks 104a and 104b in a state of applying the torsion, in a second circumferential direction which is the opposite direction of the first circumferential direction, to the second shaft 120.

If the diameter of the third shaft 128 is equal to that of the fourth shaft 130, the magnitude of the torsion applied to the third shaft 128 and the fourth shaft 130 are almost equal, and the magnitude depends on the diameter of the shafts, etc. Similarly, if diameter of the first shaft 118 is equal to that of the second shaft 120, the magnitude of the torsion applied to the third shaft 118 and the fourth shaft 120 are almost equal, where the magnitude depends on the diameter of the shafts, etc.

Since the third pinion gears 132a and 132b are respectively engaged with the second racks 106a and 106b in the state of applying the torsion, in the third circumferential direction, to the third shaft 128, reverse torsion in the fourth circumferential direction always works to bias the third pinion gear 132a. On the other hand, reverse torsion in the third circumferential direction always works to bias the third pinion gear 132b.

Since the fourth pinion gears 134a and 134b are respectively engaged with the fourth racks 106a and 106b in the state of applying the torsion in the fourth circumferential direction to the fourth shaft 130, reverse torsion in the third circumferential direction always works to bias the fourth pinion gear 134a. On the other hand, reverse torsion in the fourth circumferential direction always works to bias the fourth pinion gear 134b.

Since the fist pinion gears 122a and 122b are respectively engaged with the first racks 104a and 104b in the state of applying the torsion in the first circumferential direction, to the first shaft 118, reverse torsion in the second circumferential direction always works to bias the first pinion gear 122a. On the other hand, reverse torsion in bias the first circumferential direction always works to the first pinion gear 122b.

Since the second pinion gears 124a and 124b are respectively engaged with the first racks 104a and 104b in the state of applying the torsion in the second circumferential direction to the second shaft 120, reverse torsion in the first circumferential direction always works to bias the second pinion gear 124a. On the other hand, reverse torsion in the second circumferential direction always works to bias the second pinion gear 124b.

By the reverse torsion in the opposite directions, gear faces of the third pinion gear 132a and the fourth pinion gear 134a are biased onto gear faces of the second rack 106a. Gear faces of the third pinion gear 132b and the fourth pinion gear 134b are also biased onto gear faces of the second rack 106a by the reverse torsion in the opposite directions. Since the gear faces of the third pinion gears 132a and 132b and the fourth pinion gears 134a and 134b are always biased onto the gear faces of the second rack 106a and 106b, backlash among the third pinion gears 132a and 132b, the fourth pinion gears 134a and 134b, and the second racks 106a and 106b can be removed. By removing the backlash, they act to prevent inclination of the second pipes 126a and 126b, the third shaft 128 and the fourth shaft 130 with respect to the Y-axis as a first parallel mechanism.

By the reverse torsion in the opposite directions, gear faces of the first pinion gear 122a and the second pinion gear 124a are biased onto gear faces of the first rack 104a. Gear faces of the first pinion gear 122b and the second pinion gear 124b are also biased onto gear faces of the first rack 104a by the reverse torsion in the opposite directions. Since the gear faces of the first pinion gears 122a and 122b and the second pinion gears 124a and 124b are always biased onto the gear faces of the first racks 104a and 104b, backlash among the first pinion gears 122a and 122b, the second pinion gears 124a and 124b, and the first racks 104a and 104b can be removed. By removing the backlash, they act to prevent inclination of the first pipes 116a and 116b, the first shaft 118 and the second shaft 120 with respect to the X-axis as a second parallel mechanism.

By removing the backlash, the moving body 146 and the multi-joint arm unit, which is attached to the moving body 146, can be positioned with quite high positioning accuracy.

In the Second Embodiment, a pair of shafts to which the torsion in the opposite directions is respectively applied, are arranged in the X-direction and the Y-direction, but two or more pairs of parallel shafts to each pair of which the torsion in the opposite directions are respectively applied, may be employed. Further, the racks may be provided on inner sides of the travellers, and the pinion gears may be provided mid positions on the shafts.

Figure 7:
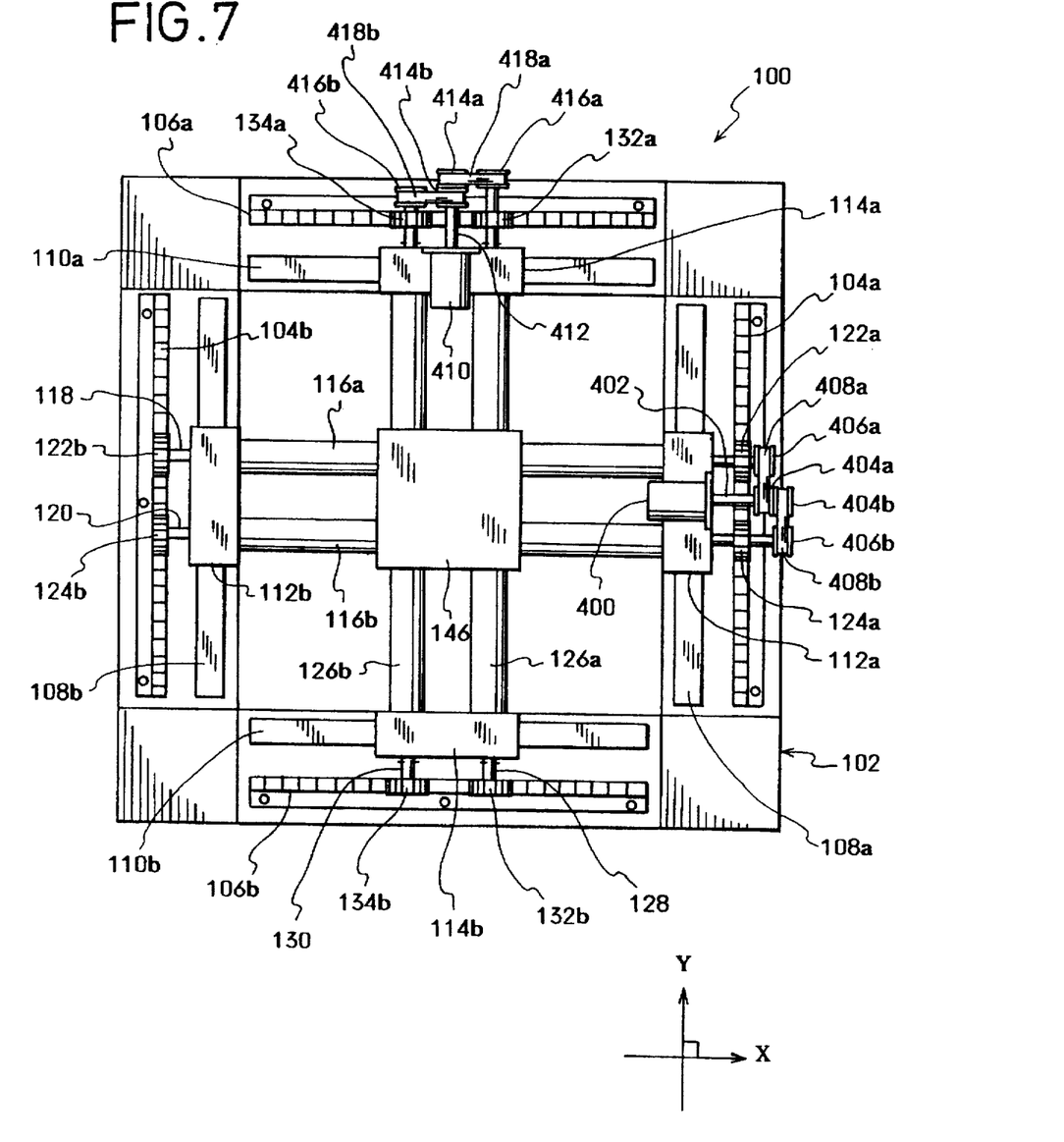
FIG. 7 is a plan view of Third Embodiment.
Figure 8:
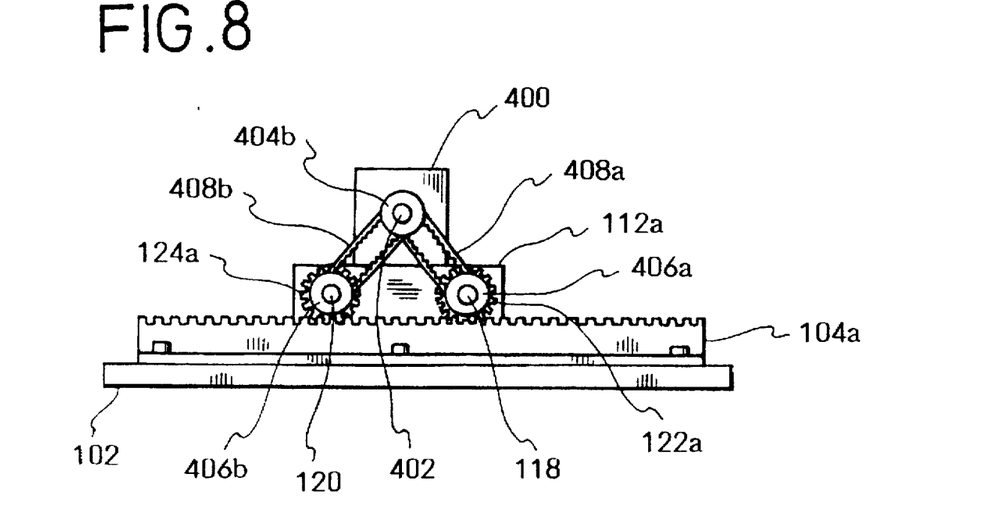
FIG. 8 is a side view of a second driving mechanism of the Third Embodiment.

Third Embodiment will be explained with reference to FIGS. 7 and 8.

Note that, the Third Embodiment is a modification of the Second Embodiment, so the same elements, which have been explained, are assigned the same symbols, and explanation will be omitted.

In the Second Embodiment, the ball screws 136 and 142 and the servo motors 140 and 144 are employed as the first and the second driving mechanism. In the Third Embodiment, the first driving mechanism includes: a first servo motor 400, which is mounted on the first traveller 112a; and a first transmitting section, which transmits torque of the first servo motor 400 so as to rotate the first shaft 118 and the second shaft 120 in the same direction. The first transmitting section includes: first timing pulleys 404a and 404b, which are fixed to an output shaft 402 of the first servo motor 410; second timing pulleys 406a and 406b, which are respectively fixed to the first shaft 118 and the second shaft 120; and first timing belts 408a and 408b, which are respectively engaged between the first timing pulleys 404a and 404b and the second timing pulleys 406a and 406b.

On the other hand, the second driving mechanism includes: a second servo motor 410, which is mounted on the second traveller 114a; and a second transmitting section, which transmits torque of the second servo motor 410 so as to rotate the third shaft 128 and the fourth shaft 130 in the same direction. The second transmitting section includes: third timing pulleys 414a and 414b, which are fixed to an output shaft 412 of the second servo motor 410; fourth timing pulleys 416a and 416b, which are respectively fixed to the third shaft 128 and the fourth shaft 130; and second timing belts 418a and 418b, which are respectively engaged between the third timing pulleys 414a and 414b and the fourth timing pulleys 416a and 416b.

When the first servo motor 410 is driven an the first shaft 118 and the second shaft 120 are rotated in the same direction. And when the second servo motor 410 is driven, the third shaft 128 and the fourth shaft 130 are rotated in the same direction. By rotating the shafts 118, 120, 128 and 130, the first travellers 112a and 112b are moved in the Y-direction at the same speed; the second travellers 114a and 114b are moved in the X-direction at the same speed. Thus, the moving body 146 to which the multi-joint arm unit (not shown) is attached can be moved in the X- and the Y-directions.

In the Third Embodiment, the backlash can be removed and the moving body 146 can be positioned with quite high positioning accuracy as well as the Second Embodiment. Note that, the first servo motor 400 rotates the shafts 118 and 120 and the second servo motor 410 rotates the shafts 128 and 130, but the motors 400 and 410 may rotate one of the two shafts and the other may rotate freely. Further, chains and sprockets, gear units, etc. may be employed as the transmitting sections instead of the timing pulleys and the timing belts.

The preferred embodiments of the present invention have been described above, but the present invention is not limited to the above described embodiments, and modifications can be allowed without departing the scope and the spirit of the invention.

What is claimed is:

1. A robot comprising:
   a two dimensional driving mechanism including:
   a pair of first racks being arranged parallel in a first direction;
   a pair of second racks being arranged parallel in a second direction perpendicular to the first direction;
   a pair of first travellers being capable of moving parallel to said first racks in the first direction;
   a pair of second travellers being capable of moving parallel to said second racks in the second direction;
   a first shaft being arranged in the second direction, said first shaft being rotatably connected to said first travellers;
   a second shaft being arranged in the second direction, said second shaft being rotatably connected to the first travellers;
   a third shaft being arranged in the first direction, said third shaft being rotatably connected to said second travellers;
   a fourth shaft being arranged in the first direction, said fourth shaft being rotatably connected to the second travellers;
   a pair of first pinion gears being fixed to the first shaft, said first pinion gears being respectively engaged with each first rack and capable of rolling thereon, said first pinion gears being engaged with said first racks with torsion, which has been applied to said first shaft, in a first circumferential direction with respect thereto;

a pair of second pinion gears being fixed to said second shaft, said second pinion gears being respectively engaged with each first rack and capable of rolling thereon, said second pinion gears being engaged with said first racks with torsion, which has been applied to said second shaft, in a second circumferential direction with respect thereto, which is the opposite direction of the first circumferential direction;

a pair of third pinion gears being fixed to said third shaft, said third pinion gears being respectively engaged with each second rack and capable of rolling thereon, said third pinion gears being engaged with said second racks with torsion, which has been applied to said third shaft, in a third circumferential direction with respect thereto;

a pair of fourth pinion gears being fixed to said fourth shaft, said fourth pinion gears being respectively engaged with each second rack and capable of rolling thereon, said fourth pinion gears being engaged with said second racks with torsion, which has been applied to said fourth shaft, in a fourth circumferential direction with respect thereto, which is the opposite direction of the third circumferential direction;

first driving means for moving said first travellers in the first direction;

second driving means for moving said second travellers in the second direction; and a moving body being capable of moving on said third and fourth shafts in the first direction and moving on said first and second shafts in the second direction; and a multi-joint arm unit being rotatably attached to said moving body, said multi-joint arm unit having a plurality of arms whose ends are pivotably connected each other.

2. The robot according to claim 1, wherein said first driving means includes:

a first ball screw being arranged in the first direction, said first ball screw being screwed with one traveller of said first travellers; and a first motor for rotating said first ball screw, and wherein said second driving means includes:

a second ball screw being arranged in the second direction, said second ball screw being screwed with one traveller of said second travellers; and a second motor for rotating said second ball screw.

3. The robot according to claim 1, wherein said first driving means includes:

a first motor being mounted on one traveller of said first travellers; and a first transmitting member for transmitting rotary torque of said first motor to rotate at least one of said first and second shafts, and wherein said second driving means includes:

a second motor being mounted on said second traveller; and a second transmitting member for transmitting rotary torque of said second motor to rotate at least one of said third and fourth shafts.

4. A robot system comprising:

a conveying route;

a three-face frame structure enclosing said conveying route, wherein three faces of said three-face frame structure are arranged parallel to said conveying route; and a two dimensional driving mechanism being provided in at least one of the faces of said three-face frame structure, said two dimensional driving mechanism including:

a pair of first racks being arranged parallel in a first direction;

a pair of second racks being arranged parallel in a second direction perpendicular to the first direction;

a pair of first travellers being capable of moving parallel to said first racks in the first direction;

a pair of second travellers being capable of moving parallel to said second racks in the second direction;

a first shaft being arranged in the second direction, said first shaft being rotatably connected to said first travellers;

a second shaft being arranged in the second direction, said second shaft being rotatably connected to the first travellers;

a third shaft being arranged in the first direction, said third shaft being rotatably connected to said second travellers;

a fourth shaft being arranged in the first direction, said fourth shaft being rotatably connected to the second travellers;

a pair of first pinion gears being fixed to the first shaft, said first pinion gears being respectively engaged with each first rack and capable of rolling thereon, said first pinion gears being engaged with said first racks with torsion, which has been applied to said first shaft, in a first circumferential direction with respect thereto;

a pair of second pinion gears being fixed to said second shaft, said second pinion gears being respectively engaged with each first rack and capable of rolling thereon, said second pinion gears being engaged with said first racks with torsion, which has been applied to said second shaft, in a second circumferential direction with respect thereto, which is the opposite direction of the first circumferential direction;

a pair of third pinion gears being fixed to said third shaft, said third pinion gears being respectively engaged with each second rack and capable of rolling thereon, said third pinion gears being engaged with said second racks with torsion, which has been applied to said third shaft, in a third circumferential direction with respect thereto;

a pair of fourth pinion gears being fixed to said fourth shaft, said fourth pinion gears being respectively engaged with each second rack and capable of rolling thereon, said fourth pinion gears being engaged with said second racks with torsion, which has been applied to said fourth shaft, in a fourth circumferential direction with respect thereto, which is the opposite direction of the third circumferential direction;

first driving means for moving said first travellers in the first direction;

second driving means for moving said second travellers in the second direction; and a moving body being capable of moving on said third and fourth shafts in the first direction and moving on said first and second shafts in the second direction.

5. The robot system according to claim 4, wherein said first driving means includes:
   a first ball screw being arranged in the first direction, said first ball screw being screwed with one traveller of said first travellers; and
   a first motor for rotating said first ball screw, and
   wherein said second driving means includes:
      a second ball screw being arranged in the second direction, said second ball screw being screwed with one traveller of said second travellers; and
      a second motor for rotating said second ball screw.

6. The robot system according to claim 4, wherein said first driving means includes:
   a first motor being mounted on one traveller of said first travellers; and
   a first transmitting member for transmitting rotary torque of said first motor to rotate at least one of said first and second shafts, and
   wherein said second driving means includes:
      a second motor being mounted on one traveller of said second travellers; and
      a second transmitting member for transmitting rotary torque of said second motor to rotate at least one of said third and fourth shafts.

7. The robot system according to claim 4, further comprising a multi-joint arm unit being rotatably attached to said moving body, said multi-joint arm unit having a plurality of arms whose ends are pivotably connected each other.

8. The robot system according to claim 7, wherein said first driving means includes:
   a first ball screw being arranged in the first direction, said first ball screw being screwed with one traveller of said first travellers; and
   a first motor for rotating said first ball screw, and
   wherein said second driving means includes:
      a second ball screw being arranged in the second direction, said second ball screw being screwed with one traveller of said second travellers; and
      a second motor for rotating said second ball screw.

9. The robot system according to claim 7, wherein said first driving means includes:
   a first motor being mounted on one traveller of said first travellers; and
   a first transmitting member for transmitting rotary torque of said first motor to rotate at least one of said first and second shafts, and
   wherein said second driving means includes:
      a second motor being mounted on one traveller of said second travellers; and
      a second transmitting member for transmitting rotary torque of said second motor to rotate at least one of said third and fourth shafts.

10. A robot system comprising:
   a conveying route;
   a plurality of three-face frame structures enclosing said conveying route, said three-face frame structures being lineally arranged, wherein three faces of each three-face frame structure are arranged parallel to said conveying route; and
   a plurality of two dimensional driving mechanisms being respectively provided in one of the faces of each three-face frame structure, each two dimensional driving mechanism including:
      a pair of first racks being arranged parallel in a first direction;
      a pair of second racks being arranged parallel in a second direction perpendicular to the first direction;
      a pair of first travellers being capable of moving parallel to said first racks in the first direction;
      a pair of second travellers being capable of moving parallel to said second racks in the second direction;
      a first shaft being arranged in the second direction, said first shaft being rotatably connected to said first travellers;
      a second shaft being arranged in the second direction, said second shaft being rotatably connected to the first travellers;
      a third shaft being arranged in the first direction, said third shaft being rotatably connected to said second travellers;
      a fourth shaft being arranged in the first direction, said fourth shaft being rotatably connected to the second travellers;
      a pair of first pinion gears being fixed to the first shaft, said first pinion gears being respectively engaged with each first rack and capable of rolling thereon, said first pinion gears being engaged with said first racks with torsion, which has been applied to said first shaft, in a first circumferential direction with respect thereto;
      a pair of second pinion gears being fixed to said second shaft, said second pinion gears being respectively engaged with each first rack and capable of rolling thereon, said second pinion gears being engaged with said first racks with torsion, which has been applied to said second shaft, in a second circumferential direction with respect thereto, which is the opposite direction of the first circumferential direction;
      a pair of third pinion gears being fixed to said third shaft, said third pinion gears being respectively engaged with each second rack and capable of rolling thereon, said third pinion gears being engaged with said second racks with torsion, which has been applied to said third shaft, in a third circumferential direction with respect thereto;
      a pair of fourth pinion gears being fixed to said fourth shaft, said fourth pinion gears being respectively engaged with each second rack and capable of rolling thereon, said fourth pinion gears being engaged with said second racks with torsion, which has been applied to said fourth shaft, in a fourth circumferential direction with respect thereto, which is the opposite direction of the third circumferential direction;
      first driving means for moving said first travellers in the first direction;
      second driving means for moving said second travellers in the second direction; and
      a moving body being capable of moving on said third and fourth shafts in the first direction and moving on said first and second shafts in the second direction.

11. The robot system according to claim 10, wherein said first driving means includes:
   a first ball screw being arranged in the first direction, said first ball screw being screwed with one traveller of said first travellers; and
   a first motor for rotating said first ball screw, and
   wherein said second driving means includes:
      a second ball screw being arranged in the second direction, said second ball screw being screwed with one traveller of said second travellers; and
      a second motor for rotating said second ball screw.

12. The robot system according to claim 10, wherein said first driving means includes:

a first motor being mounted on said first traveller; and a first transmitting member for transmitting rotary torque of said first motor to rotate at least one of said first and second shafts, and wherein said second driving means includes:

a second motor being mounted on said second traveller; and a second transmitting member for transmitting rotary torque of said second motor to rotate at least one of said third and fourth shafts.

13. The robot system according to claim 10, further comprising a plurality of multi-joint arm units being respectively rotatably attached to each moving body of each two dimensional driving mechanism, each multi-joint arm unit having a plurality of arms whose ends are pivotably connected each other.

14. The robot according to claim 13, wherein said first driving means includes:

a first ball screw being arranged in the first direction, said first ball screw being screwed with one traveller of said first travellers; and a first motor for rotating said first ball screw, and wherein said second driving means includes:

a second ball screw being arranged in the second direction, said second ball screw being screwed with one traveller of said second travellers; and a second motor for rotating said second ball screw.

15. The robot system according to claim 13, wherein said first driving means includes:

a first motor being mounted on one traveller of said first travellers; and a first transmitting member for transmitting rotary torque of said first motor to rotate at least one of said first and second shafts, and wherein said second driving means includes:

a second motor being mounted on one traveller of said second travellers; and a second transmitting member for transmitting rotary torque of said second motor to rotate at least one of said third and fourth shafts.

* * * * *